United States Patent
Xiong et al.

(10) Patent No.: US 10,243,473 B1
(45) Date of Patent: Mar. 26, 2019

(54) GATE DRIVE IC WITH ADAPTIVE OPERATING MODE

(71) Applicant: Universal Lighting Technologies, Inc., Madison, AL (US)

(72) Inventors: Wei Xiong, Madison, AL (US); Travis L. Berry, Madison, AL (US); Keith Davis, Madison, AL (US)

(73) Assignee: Universal Lighting Technologies, Inc., Madison, AL (US)

( * ) Notice: Subject to any disclaimer, the term of this patent is extended or adjusted under 35 U.S.C. 154(b) by 0 days.

(21) Appl. No.: 16/116,072

(22) Filed: Aug. 29, 2018

Related U.S. Application Data

(60) Provisional application No. 62/553,200, filed on Sep. 1, 2017.

(51) Int. Cl.
  *H02M 3/335* (2006.01)
  *H02M 1/088* (2006.01)
  *H02M 1/44* (2007.01)

(52) U.S. Cl.
  CPC ....... *H02M 3/33569* (2013.01); *H02M 1/088* (2013.01); *H02M 1/44* (2013.01)

(58) Field of Classification Search
  CPC .......... H02M 1/088; H02M 1/32; H02M 1/36; H02M 1/44; H02M 3/33507; H02M 3/33569
  See application file for complete search history.

(56) References Cited

U.S. PATENT DOCUMENTS

| | | | | |
|---|---|---|---|---|
| 4,349,752 A | * | 9/1982 | Forte | H03K 17/601 323/289 |
| 7,595,969 B2 | * | 9/2009 | Oba | G01R 19/16538 361/92 |
| 8,054,652 B2 | * | 11/2011 | Miftakhutdinov | H02M 1/32 363/21.01 |
| 2012/0153858 A1 | * | 6/2012 | Melanson | H02M 3/33523 315/279 |

* cited by examiner

*Primary Examiner* — Matthew Nguyen
(74) *Attorney, Agent, or Firm* — Patterson Intellectual Property Law, P.C.; Gary L. Montle; Alex H. Huffstutter

(57) ABSTRACT

An LED driver is provided having a gate drive integrated circuit with an adaptive operating mode which operates between a first operating mode and a second operating mode. The gate drive integrated circuit is designed to primarily operate in the first operating mode which includes a predetermined minimum on-time and a predetermined maximum off-time for enabling and disabling gate drive signals to a switch, respectively. The second operating mode begins at the minimum on-time and the maximum off-time. The LED driver further includes a controller configured to monitor an on-time and an off-time of the gate drive signals. The controller is further configured responsive to the second operating mode to fix the on-time equal to the predetermined minimum on-time and to continually adjust the off-time greater than or equal to the maximum off-time.

20 Claims, 8 Drawing Sheets

GATE DRIVE IC WITH ADAPTIVE OPERATING MODE

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of the following patent application(s) which is/are hereby incorporated by reference: U.S. Provisional Patent Application No. 62/553,200 filed Sep. 1, 2017, entitled "Gate Drive IC with Adaptive Operating Mode."

FIELD OF THE INVENTION

The present disclosure relates generally to power supplies that provide a constant DC output current to a load, such as, for example, light-emitting diodes. More particularly, the present disclosure relates to a lighting device including adaptive gate driving circuitry which automatically switches between operating modes to avoid flickering in a lighting output from the lighting device.

BACKGROUND

The usage of light-emitting diodes (LEDs) to provide illumination is increasing rapidly as the cost of LEDs decrease and the endurance of the LEDs increases to cause the overall effective cost of operating LED lighting products to be lower than incandescent lamps and fluorescent lamps providing equivalent illumination. Also, LEDs can be dimmed by controlling the current through the LEDs because LEDs are current driven devices. The current through a plurality of LEDs in a lighting device must be controlled tightly in order to control the illumination provided by the LEDs. Typically, the secondary (output side) of an LED lighting device must be electrically isolated from the primary (line and neutral side) of the lighting device to meet applicable safety standards (e.g., IEC class II isolation). In addition, an LED driver circuit should desirably have a high power factor and constant current control.

Flyback-type DC-DC converters are conventionally known in the art for constant current supply based on their relative simplicity and the abundance of low-cost gate drive integrated circuits (IC) available in the market. Referring to FIG. 1, one example of an LED driver 100 utilizing an isolated flyback converter with constant output current control is shown. The LED driver 100 includes a primary side circuit 110, a secondary side circuit 130, and a feedback circuit 150. The primary side and secondary side circuits 110, 130 are electrically isolated via a flyback transformer T1. The transformer T1 includes a primary winding T1_P and a secondary winding T1_S.

The primary side circuit 110 includes the primary winding T1_P, a first switching element Q1, a gate drive integrated circuit (IC) 112, and a primary voltage source V_in. The primary voltage source V_in may be provided either from an input rectifier such as a diode bridge (not shown) or from a power factor correction circuit (not shown) output. Accordingly, the primary input voltage V_in is generally characterized herein as a DC voltage supply.

A conventional example of the gate drive IC 112 may be an L6562 controller from STMicroelectronics, and is configured to enable and disable gate drive signals 112_S to switching element Q1 based on various input signals. The gate drive IC 112 as simplified in FIG. 1 is coupled to the feedback circuit 150, and includes at least a gate drive logic circuit 114 and an error amplifier (OPAMP) 116. The gate drive OPAMP 116 includes at least an inverting input 116_I, a non-inverting input 116_NI, and an output 116_O. The output 116_O is configured to produce and transmit an error signal 118 to the gate drive logic circuit 114. The first switching element Q1 (e.g., a MOSFET) includes a drain node Q1_D, a gate node Q1_G, and a source node Q1_S. The gate node Q1_G is configured to receive the gate drive signals 112_S for enabling and disabling the first switching element Q1.

The primary side circuit 110 further includes a first resistor R1, a second resistor R2, a third resistor R3, a fourth resistor R4, a fifth resistor R5, a first capacitor C1, and a secondary voltage source Vcc. The primary winding T1_P is coupled between the primary voltage source V_in and the drain node Q1_D of the first switching element Q1. The fifth resistor R5 is coupled between the source node Q1_S of the first switching element Q1 and a primary side ground GND_P.

First and second resistors R1, R2 are configured as a divider network to generate and transmit a multiplier signal 120_M from a multiplier node 120 to the gate drive logic circuit 114. The first resistor R1 is coupled between the first node 120 and the primary voltage input V_in. The second resistor R2 is coupled between the first node 120 and the primary side ground GND_P.

The secondary voltage source Vcc is coupled between the primary side ground GND_P and voltage input 112_Vcc of the gate drive IC 112. The feedback circuit 150 is coupled to the inverting input 116_I of the gate drive OPAMP 116. Resistor R3 is coupled between the inverting input 116_I of the gate drive OPAMP 116 and the voltage input 112_Vcc of the gate drive IC 112. Resistor R4 is coupled between the primary side ground GND_P and the inverting input (INV) 116_I of the gate drive OPAMP 116. An integrating capacitor C1 is coupled between the inverting input 116_I of the gate drive OPAMP 116 and the output pin (COMP) 116_O of the gate drive OPAMP 116.

The non-inverting input 116_NI of the gate drive OPAMP 116 is configured to receive an internal reference voltage signal (V_ref) of the gate drive IC 112. The gate drive logic circuit 114 is configured to receive a switch current feedback signal 122 through the first switching element Q1 as sensed by resistor R5. The gate drive signals 112_S are provided to the gate node Q1_G of the first switching element Q1 via the gate drive logic circuit 114 based on signals from the feedback circuit 150 at the inverting input 116_I, the multiplier signal 120_M (via the first and second resistors R1, R2 and corresponding to the input voltage V_in), the switch current signal 122 (through the resistor R5), and the error signal 118 produced at the output 116_O of the gate drive OPAMP 116.

The secondary side circuit 130 includes the secondary winding T1_S, a diode D1, an output filter capacitor C2, and a load current sensing resistor R6 coupled in series with a load (R_load). The secondary winding T1_S is coupled between a secondary side ground GND_S and an anode of the diode D1. The output capacitor C2 is coupled between a cathode of the diode D1 and the secondary side ground GND_S. The diode D1 is configured to allow energy stored in the secondary winding T1_S to charge up the output capacitor C2 when the first switching element Q1 is turned off. An output node (e.g., between the cathode of diode D1 and a first terminal of the output capacitor C1) is also connected to a first terminal of the load, which may comprise, for example, one or more light-emitting diodes (LEDs) that emit light when sufficient current passes through the LEDs. A second terminal of the load is connected to a current sensing terminal 132 and to the first terminal of the current sensing resistor R6. A second terminal of the current sensing resistor is connected to the secondary circuit ground reference (GND_s). When current flows through the load, the same current flows through the current sensing resistor. Accordingly, a voltage develops on the current sensing terminal that has a magnitude with respect to the secondary circuit ground reference that is proportional to the current flowing through the load. In one embodiment, the current sensing resistor has a resistance of, for example, 0.1 ohm such that the effect of the resistance of the current sensing resistor on the load current is insignificant.

The feedback circuit 150 is coupled between the output current node 132 of the secondary side circuit 130 and the inverting input 116_I of the gate drive OPAMP 116. Because the intensity of the light emitted by the LEDs in the load (R_load) is dependent on the magnitude of the current flowing through the LEDs, the current is controlled closely. The current sensing resistor R6 senses the current going through the load and develops a voltage on the current sensing node proportional to the load current. The voltage representing the sensed current is fed back to a proportional integral (PI) current control loop to provide current regulation. In FIG. 1, the PI current control loop comprises an operational amplifier (OPAMP) 152 having an inverting (−) input terminal 152_I, a non-inverting (+) input terminal 152_NI, and an output on an output terminal 152_O. The current sensing node is connected to the inverting input of the operational amplifier via a series resistor R7. A feedback resistor R8 and a feedback capacitor C3 are connected in series between the output terminal of the operational amplifier and the inverting input. A reference current (I_ref) or a reference voltage having a magnitude corresponding therewith is connected to the non-inverting input of the operational amplifier. The reference current signal I_ref may for example be provided from an external dimming control device, a local user interface, one or more sensors, a lighting management system, or the like. The magnitude of the reference current may be selected to produce a desired load current through the load. The reference current may be a fixed reference current to provide a constant load current, or the reference current may be a variable reference current to allow the load current to be varied to thereby change the intensity of the light emitted by the LEDs in the load. For example, a reference voltage may be generated by a dimmer circuit (not shown) that selectively produces a plurality of voltage levels corresponding to a plurality of load currents, wherein each magnitude of load current corresponds to a light intensity. The operational amplifier is responsive to the relative magnitudes of the reference signal and the sensed output signal to provide feedback to the gate drive IC 112 as described below.

The output 152_O of the operational amplifier 152 is connected to a first input of a photocoupler 154. The photocoupler (also referred to as an opto-isolator or an optocoupler) has an internal light generation section (e.g., an LED) 154_D coupled to the input of the photocoupler. In the illustrated embodiment, the output voltage from the operational amplifier is applied to the cathode of the internal LED via the first input. The anode of the internal LED is connected via a second input of the photocoupler to a first terminal of a pullup resistor R9. A second terminal of the pullup resistor is connected to a secondary positive voltage source Vcc_s, which is referenced to the secondary ground reference GND_S. The voltage source also provides the supply voltage to the operational amplifier. The internal LED in the light generation section is responsive to a low voltage applied to the first input to generate light. The intensity of the generated light is responsive to the magnitude of the difference between the voltage on the first input and the secondary positive voltage. The generated light is propagated internally to the base of a phototransistor 154_E in an output section within the same component. The phototransistor is responsive to the generated light to vary the conductivity and thereby to effectively vary the impedance of the phototransistor. The phototransistor has a collector that is connected to a current control node between (previously described) resistors R3, R4. The phototransistor has an emitter that is connected to the primary circuit ground reference GND_P. As illustrated the photocoupler electrically isolates the secondary circuit voltages and the secondary circuit ground reference in the secondary circuit side 130 from the components in the primary circuit side 110.

When the voltage applied to the first input of the photocoupler 154 from the output 152_O of the operational amplifier 152 decreases (e.g., becomes more negative with respect to the secondary positive voltage (Vcc_s) connected to the pullup resistor R9), the conduction of the phototransistor 154_E in the output section of the photocoupler increases to effectively reduce the resistance from the current control node between resistors R3, R4 to the primary circuit ground reference GND_P such that the current from the feedback circuit 150 as a whole increases. The increased current increases the switching frequency of the gate drive IC 112.

When the voltage applied to the first input of the photocoupler 154 increases (e.g., becomes less negative with respect to the secondary positive voltage ($V_{CC\_S}$) connected to the pullup resistor R9), the conduction of the phototransistor 154_E in the output section of the photocoupler decreases to effectively increase the resistance from the control node between resistors R3, R4 to the primary circuit ground reference GND_P such that the current from the feedback circuit 150 decreases. The decreased current decreases the switching frequency of the gate drive IC 112.

The duty cycle of the on-time of the switching element Q1 decreases with increased frequency and increases with decreased frequency. A decrease in duty cycle causes the energy transferred to the load to decrease. An increase in duty cycle causes the energy transferred to the load to increase. Thus, the load current decreases with increased switching frequency, and the load current increases with decreased switching frequency.

From the foregoing, it can be seen that when the load current through the current sensing resistor R6 generates a voltage that is less than the voltage corresponding to the reference current I_ref, the output voltage of the operational amplifier 152 increases. The increased output voltage produced by the operational amplifier causes the photocoupler 154 to decrease the light generated between the input section and the output section, which causes the photoresistor 154_E in the output section to decrease conductivity and thus increase the effective impedance on the emitter 116_O of the gate drive OPAMP 116. The increased effective impedance decreases the voltage on the inverting pin (INV) 116_I of the OPAMP. The decreased voltage decreases the switching frequency of the gate drive IC 112, which increases the duty cycle of the switching voltage applied to the control input terminal of the switching element Q1. The increased duty cycle has the effect of increasing the energy transferred to the output filter capacitor C2, which increases the voltage on the output node, which increases the current flowing through the load (R_load). The load current will increase until the sensed load current is substantially equal to the reference current (I_ref).

When the current flowing through the load (R_load) is greater than the reference current (I_ref), the opposite transitions occur. The voltage on the output 152_O of the operational amplifier 152 decreases. The decreased output voltage produced by the operational amplifier causes the photocoupler 154 to increase the light generated between the input section and the output section, which causes the phototransistor 154_E in the output section to increase conductivity and thus decrease the effective impedance on the emitter 116_O of the gate drive OPAMP 116. The decreased effective impedance increases the voltage on the inverting pin (INV) 116_I of the OPAMP. The increased current increases the switching frequency of the gate drive IC 112, which decreases the duty cycle of the switching voltage applied to the control input terminal of the switching element Q1. The decreased duty cycle has the effect of decreasing the energy transferred to the output filter capacitor C2, which decreases the voltage on the output node, which decreases the current flowing through the load. The load current will decrease until the sensed load current is substantially equal to the reference current.

Critical mode (also known as boundary mode or critical conduction mode) gate drive IC's are conventionally known and popular at least in part for their relative simplicity. Referring next to FIG. 2, an exemplary operation of the aforementioned lighting device in a critical mode 200 may now be described. A primary current T1_PI through the primary winding T1_P of the transformer T1 starts from zero amperes and rises throughout application of gate drive signals 112_S and a corresponding on-time T_on of the switching element Q1, and a secondary current T1_SI through the secondary winding T1_S of the transformer T1 starts high when the gate drive signals 112_S are removed and falls during a corresponding off-time T_off of the switching element to zero amperes.

As shown in FIG. 2, the output current (I_out) through the load (R_load) is the average of the secondary current T1_SI in the secondary winding T1_S. The relationship between the primary current T1_PI and the secondary current T1_SI is as follows:

$$T1\_PI = N \times T1\_SI \quad (1)$$

where N is the turns ratio between the primary winding and the secondary winding of the isolation transformer.

As shown in equation (1), a higher primary current T1_PI is associated with a higher secondary current T1_SI. A longer on-time T_on of the first switching element Q1 produces more current through the primary winding T1_P and correspondingly more current through the secondary winding T1_S, which will result in a higher output current I_out through the load R_load.

According to inductor voltage-time relationship, the on and off time T_on, T_off of the gate drive signal can be defined as:

$$V\_in \times T\_on = N \leq V\_load \leq T\_off = N \times (I\_out \times R\_load) \times T\_off \quad (2)$$

where V_load is the load voltage and R_load is an equivalent resistance of the load at a certain output current I_out.

According to equation (2), when the output current I_out and the equivalent resistance of the load R_load reaches a certain value, the on-time T_on will be at a minimum on-time T_on_min and off-time T_off will be at maximum off-time T_off_max. For at least the purposes of the present disclosure, we may define this value as the start of discontinuous mode 300 (as shown in FIG. 3) operation having a corresponding discontinuous output voltage V_load_dis, a discontinuous output current I_out_dis, and a discontinuous equivalent resistance of the load R_load_dis. Equation (2) updated for the discontinuous mode of operation can be defined as:

$$V\_in \times T\_on\_min = \times V\_load\_dis \leq T\_off\_max$$
$$= N \times (I\_out\_dis \times R\_load\_dis) \times T\_off\_max \quad (3)$$

By conventional design, a critical mode gate drive IC 112 has an internal minimum on-time T_on_min and a maximum off-time T_off_max. As such, if the output current I_out and equivalent resistance of the load R_load decreased further below the discontinuous output current I_out_dis and the discontinuous load resistance R_load_dis, then the gate drive IC 112 will not be able to further reduce its on-time T_on and increase its off-time T_off to compensate the output current I_out and/or load resistance R_load. As a result the gate drive IC 112 will be forced into a third mode of operation, defined for at least the purposes of the present disclosure as a random pulse mode.

As illustrated in FIG. 4, in the random pulse operating mode 400 when the equivalent load resistance R_load is very small (associated with a low output current and a low output voltage) the gate drive signals 112_S will randomly pulse to maintain a certain average output current I_avg of the load R_load. Since the gate drive signals 112_S are randomly pulsing, the output current I_out and load voltage V_load will be randomly changing, which will result in an annoying flickering of the lighting output from the load. This is highly undesirable at any time for LED lighting applications, so it is very important to keep the gate drive signals 112_S as consistent as possible to avoid LED flickering. It would therefore be desirable, for the purpose of avoiding flickering, that the gate drive IC remain in either the critical mode 200 or the discontinuous mode 300.

According to equation (3), when the output current I_out is less than the discontinuous output current I_out_dis and the equivalent resistance R_load of the load is less than the discontinuous equivalent resistance R_load_dis of the load, the gate drive IC would be able to maintain a regular continuous operating mode 200, 300 (to avoid the random pulsing mode 400) if the off-time T_off could be further increased to allow the gate drive IC entering into the discontinuous operating mode 300 to maintain that state of operation.

There are no available solutions for avoiding the random pulse mode when the gate drive integrated circuit is operated at its limits, or when the output current or equivalent resistance of the load are decreased below their discontinuous values.

BRIEF SUMMARY

To make the transition from critical mode to discontinuous mode smooth and to avoid the random pulse mode and associated undesirable results (e.g., flickering of lighting output), the conventional gate drive integrated circuit is modified in various embodiments as disclosed herein to provide a novel controller having or otherwise associated with a logic core configured for an adaptive operating mode.

In one aspect, the novel controller may be provided for a lighting device such as an LED driver having an adaptive operating mode.

In a particular embodiment as disclosed herein, a power converter includes a power stage comprising at least one switching element and configured to provide to a load an output current corresponding to an on-time of the at least one switching element. A controller selectively enables and disables gate drive signals to the switching element to maintain a desired output current. During a first operating mode, the controller generates the gate drive signals in accordance with a predetermined minimum on-time and a predetermined maximum off-time. Upon sensing that one or more gate drive signals have reached the predetermined minimum on-time and predetermined maximum off-time during the first operating mode, the controller enters a second operating mode and fixes an on-time for subsequently generated gate drive signals to be equal to the predetermined minimum on-time, and enables adjustment of an off-time for said gate drive signals to be greater than or equal to the predetermined maximum off-time.

In an embodiment, the power stage further comprises a transformer having a primary winding and a secondary winding, with the primary winding coupled in series with and controlled by the at least one switch, the secondary winding coupled to the load, and the primary winding having primary current and the secondary winding having a secondary current. A feedback circuit is coupled between the load and the controller, and configured to convert the output current of the load into a feedback error voltage by comparing the output current with a reference current. The feedback circuit further transmits the feedback error voltage to the controller.

In another embodiment, during the first operating mode the primary current starts from zero and rises during an on-time for the switching element, and the secondary current starts at a highest value when an off-time for the switching element begins and falls to zero.

In another embodiment, during the second operating mode the controller is configured to reduce the secondary current to zero before a successive on-time.

In another embodiment, the off-time is continually adjusted during the second operating mode.

In another embodiment, the controller includes an internal comparator configured to output an internal error voltage. The internal error voltage is continuously compared with a present voltage, and the controller is responsive to the internal error voltage to adjust the off-time of the gate drive signals in the second operating mode.

In another embodiment, the controller increases the off-time of the gate drive signals in the second operating mode when the internal error voltage is greater than the preset voltage.

In another embodiment, the controller decreases the off-time of the gate drive signals in the second operating mode when the internal error voltage is less than the preset voltage.

In another embodiment, the controller maintains the off-time of the gate drive signals in the second operating mode when the internal error voltage is substantially equal to the preset voltage.

In another embodiment, the controller adjusts the off-time and the on-time to maintain a switching frequency greater than 120 Hz.

DETAILED DESCRIPTION

Figure 1:
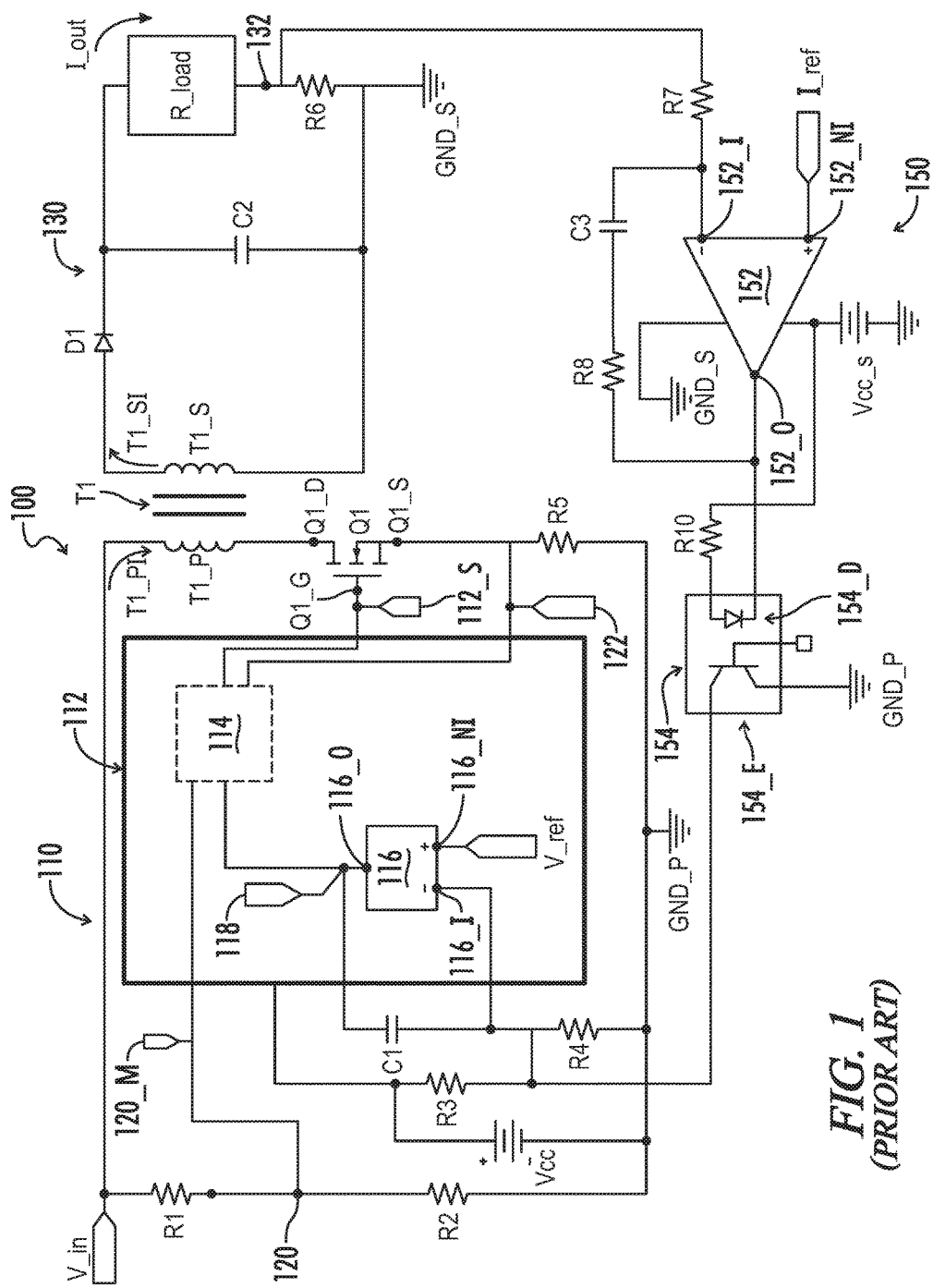
FIG. 1 is a circuit block diagram representing a typical LED driver and gate drive integrated circuit with constant current control.
Figure 2:
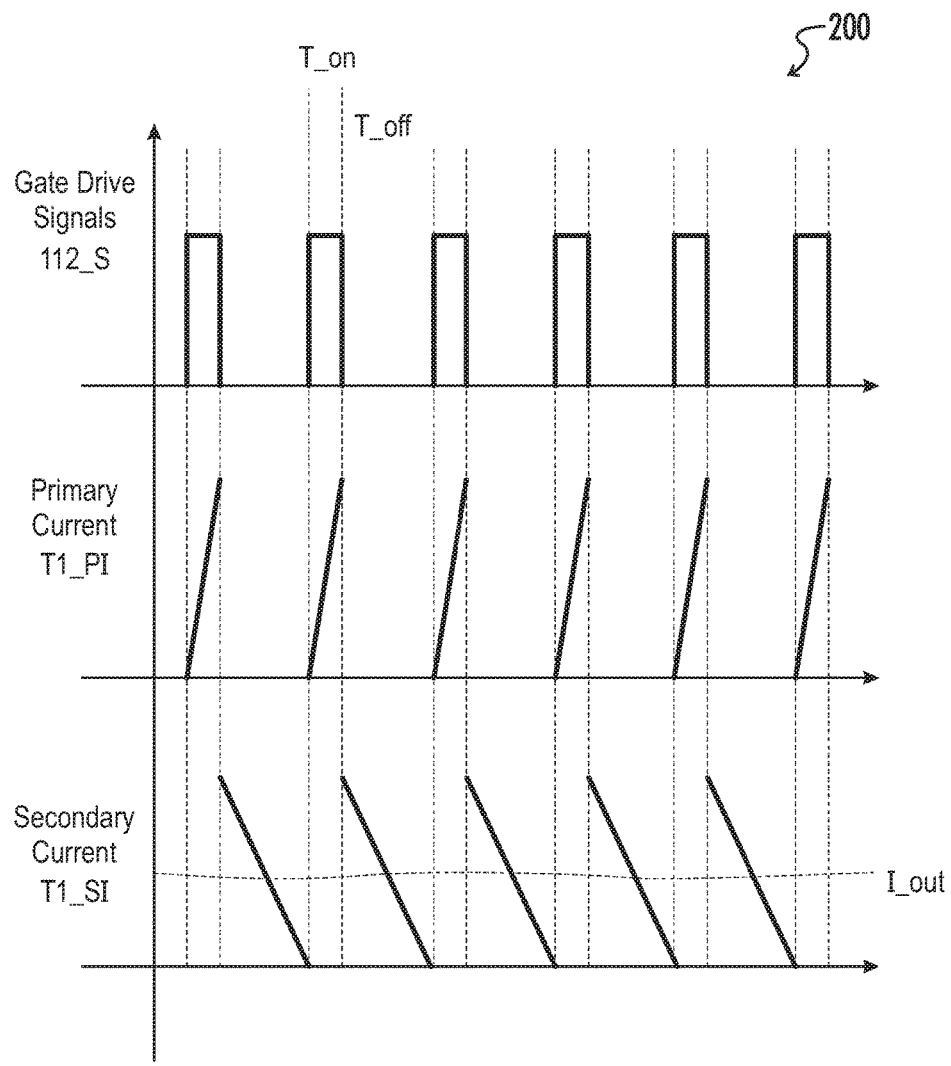
FIG. 2 is a graphical diagram representing a pattern of gate drive signals and corresponding primary and secondary currents of the circuit of FIG. 1 when the gate drive integrated circuit is operating in a first (or critical) mode.
Figure 3:
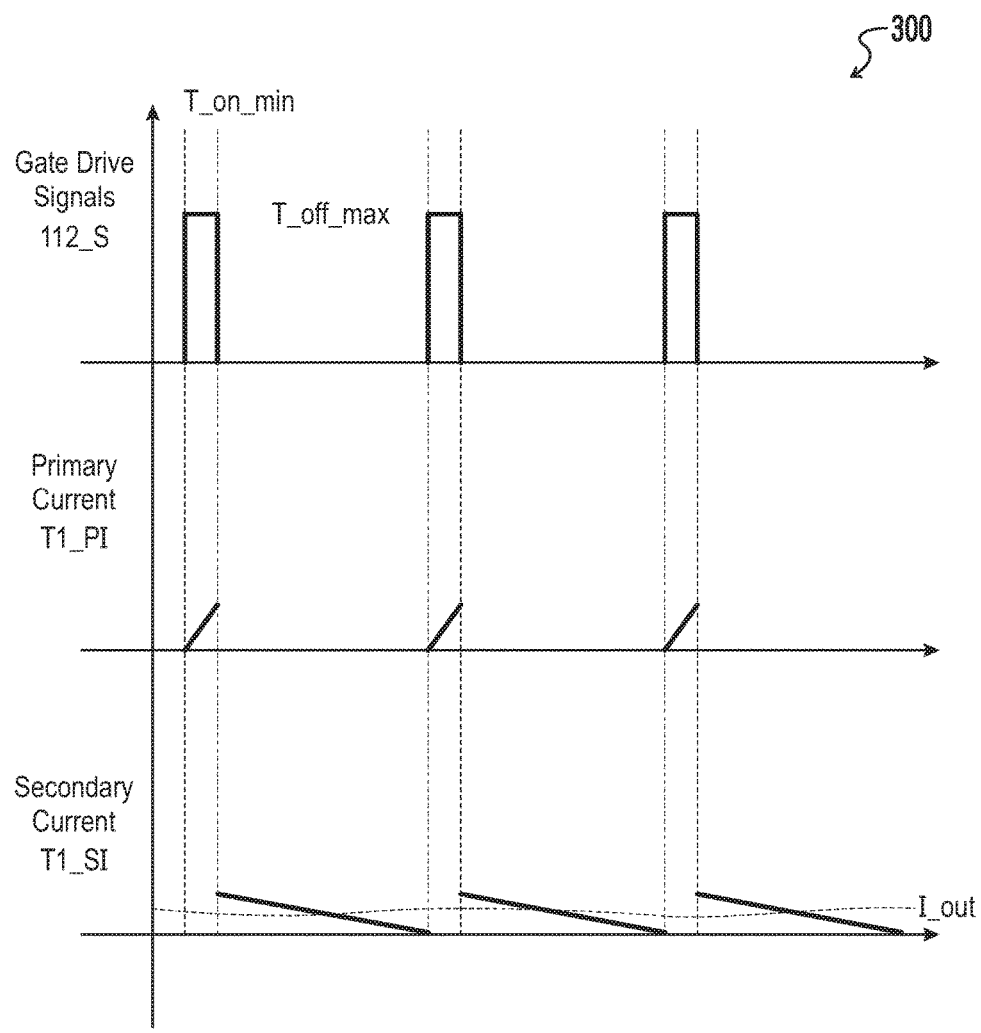
FIG. 3 is a graphical diagram representing a pattern of gate drive signals and corresponding primary and secondary currents of the circuit of FIG. 1 when the gate drive integrated circuit is operating in a second (or discontinuous) mode.
Figure 4:
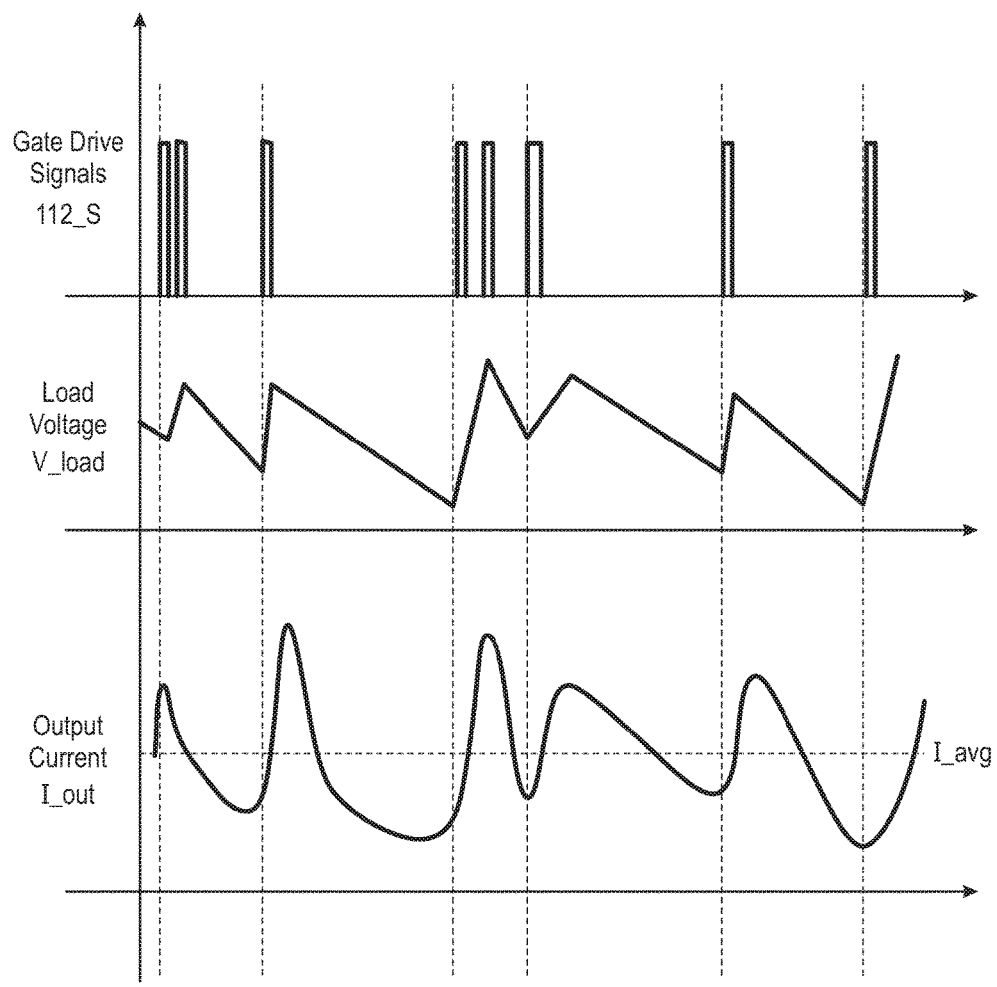
FIG. 4 is a graphical diagram representing a pattern of gate drive signals, a corresponding voltage across an output capacitor, and a corresponding output current of the circuit of FIG. 1 when the gate drive integrated circuit is operating in a third (or random pulse) mode.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention. Where the various figures may describe embodiments sharing various common elements and features with other embodiments, similar elements and features are given the same or similar reference numerals and redundant description thereof may be omitted below.

Figure 5:
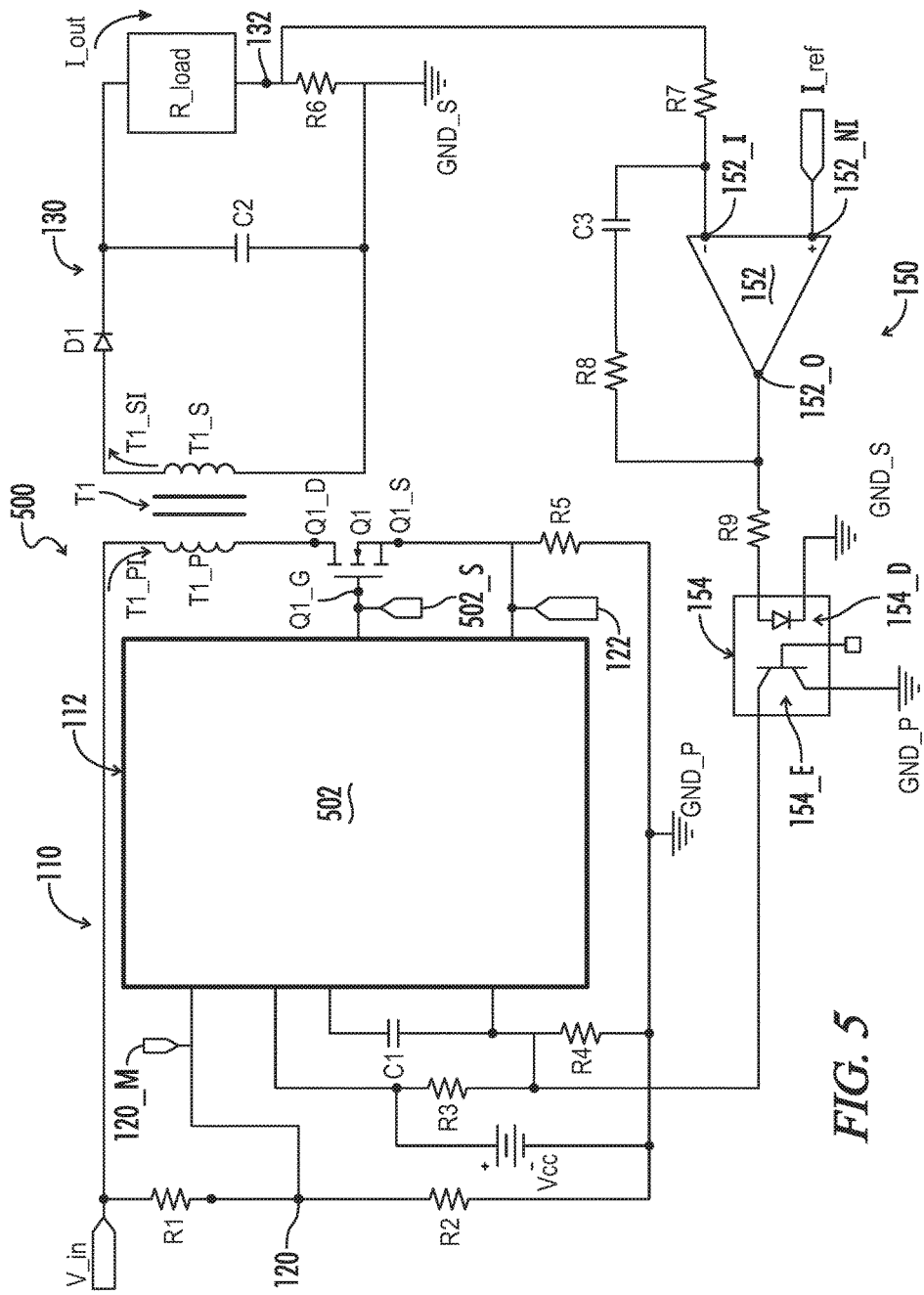
FIG. 5 is a circuit block diagram representing a power converter having a controller to enable a hybrid mode of operation including a first mode and a second mode in accordance with an embodiment of the present disclosure.

Referring generally to FIG. 5, exemplary light emitting diode (LED) drivers, gate drive integrated circuits, and methods to enable a smooth transition from a first operating mode to a second operating mode of a gate drive integrated circuit are now illustrated in greater detail. An exemplary power converter 500 may be referred to as embodying or otherwise embodied by an LED lighting device or an LED driver, and may for example further provided in modular fashion as part of a lighting apparatus such as a fixture. Similar parts or elements of the power converter 500 are numbered similarly to parts or elements of the LED driver 100.

The power converter 500 includes a controller 502 in place of the gate drive integrated circuit (IC) 112 of the LED driver 100. The controller 502 is configured to selectively enable and disable gate drive signals 502_S to the first switching element Q1 of the power converter 500, so as for example to operate exclusively in the critical mode 200 and the discontinuous mode 300. The critical mode 200 may also be referred to herein as a first operating mode, a critical operating mode, or a primary operating mode. The discontinuous mode 300 may also be referred to herein as a second operating mode, a discontinuous operating mode, or a secondary operating mode.

In order for the power converter 500 to avoid the undesirable random pulse mode 400, also defined herein as a third operating mode, the controller 502 may be responsive to sensing of conditions associated with the first operating mode 200 and the second operating mode 300. In the first operating mode 200, the controller is configured to generate gate drive signals 502_S in accordance with a predetermined minimum on-time T_on_min and a predetermined maximum off-time T_off_max. In other words, the controller operates within configured parameters for operation of the switching element, wherein an on-time for the switching element exceeds the predetermined minimum on-time and an off-time for the switching element is less than the predetermined maximum off-time.

The controller 502 is configured to sense when operation of the switching element during the critical mode produces gate drive signals that would exceed the predetermined boundaries to otherwise achieve the desired output current. Upon sensing that one or more gate drive signals 502_S have reached the predetermined minimum on-time T_on_min and/or the predetermined maximum off-time T_off_max during the first operating mode 200, the controller as disclosed herein begins operating in the second operating mode 300. In an embodiment, the controller 502 fixes the on-time T-on for subsequently generated gate drive signals 502_S to be equal to the predetermined minimum on-time T_on_min. Furthermore, in the second operating mode 300, the controller 502 enables adjustment of an off-time T_off of the gate drive signals 502_S to be greater than or equal to the predetermined maximum off-time T_off_max.

The term "controller" as used herein may refer to, be embodied by or otherwise included within a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed and programmed to perform or cause the performance of the functions described herein. A general purpose processor can be a microprocessor, a microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

Figure 6:
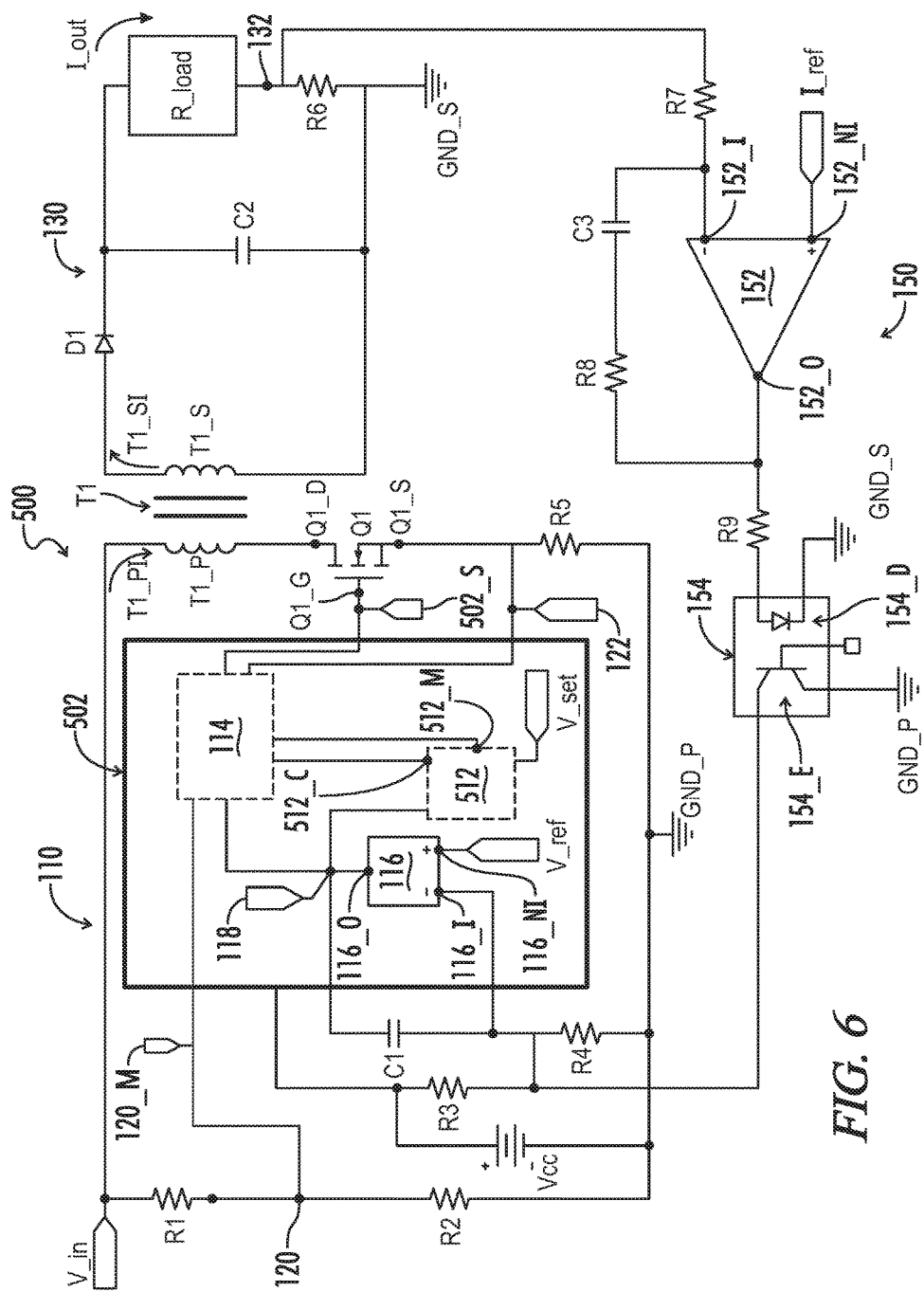
FIG. 6 is a circuit block diagram of the power converter of FIG. 5 with a more detailed controller in accordance with an embodiment of the present disclosure.

Referring next to FIG. 6, an exemplary embodiment of a controller 502 of the power converter 500 may be embodied similar to the gate drive integrated circuit 112 of the LED driver 100. The controller 502 may for example include the internal OPAMP 116 and the gate drive logic circuit 114, as further supplemented by a logic core 512. In an embodiment, the logic core may comprise logic circuitry instantiated on an IC alongside the aforementioned controller elements and one or more memory units.

The logic core 512 may include input/output (I/O) connections and peripheral supporting circuitry for connecting the logic core to one or more external connections, sensors, devices or the like. In an embodiment, the logic core includes at least one monitoring connection 512_M coupled to the gate drive logic circuit 114 and at least one controlling connection 512_C coupled to the gate drive logic circuit 114. The at least one monitoring connection 502_M is configured to monitor the on-time T_on and the off-time T_off of the gate drive signals 502_S as produced by the gate drive logic circuit 114. When the logic core is active (i.e., when the controller 502 is in the second operating mode 300), the logic core may utilize the controlling connection 502_C to fix or set the on-time T_on to be equal to the predetermined minimum on-time T_on_min and to continually adjust the off-time T_off to be greater than or equal to the maximum off time T_off_max. By adjusting the off-time T_off to be greater than or equal to the maximum off-time T_off_max, the power converter 500 will remain in the second operating mode 300 and avoid the third operating mode 400. This configuration allows the power converter 500 to avoid flickering, which is associated with the LED driver 100 entering into the third operating mode 400 when the equivalent resistance of the load R_load and/or output current I_out drop below the standard capabilities of the gate drive IC 112, as described above.

The logic core 512 may further be coupled to the output 116_O of the gate drive OPAMP 116 and be configured to monitor the error signal 118 produced by the OPAMP 116. The error signal 118 may also be referred to herein as an error voltage 118. The logic core in an embodiment is configured to adjust the off-time T_off to keep the error signal substantially equal to a certain preset value V_set. The preset value V_set may also be referred to herein as a preset voltage V_set. When the error signal 118 is greater than the preset value V_set, the logic core 512 will increase the off-time T_off of the gate drive signals 502_S. When the error signal 118 is less than the preset value V_set, the logic core 512 will decrease the off-time T_off of the gate drive signals 502_S. When the error signal 118 is substantially equal to the preset value V_set, the logic core 512 will maintain the off-time T_off at its present value.

Practically speaking, even accounting for continuous operation of the apparatus and method as disclosed herein for avoidance of the third operating mode 400, the lighting output from the device may still experience flickering if a ripple frequency of the current through the load (e.g., LED array) is less than 120 Hz. Accordingly, the logic core 512 of the controller 502 may be further configured to force the switching frequency (i.e., 1/(T_on_min+T_off)) to be greater than 120 Hz. The switching frequency greater than or equal to 120 Hz is a further safeguard to avoid undesirable flickering.

In certain embodiments, the logic core 512 of the controller 502 may be configured to switch operation back and forth between the first operating mode 200 and the second operating mode 300 when necessary to avoid the third operating mode 400.

Figure 7:
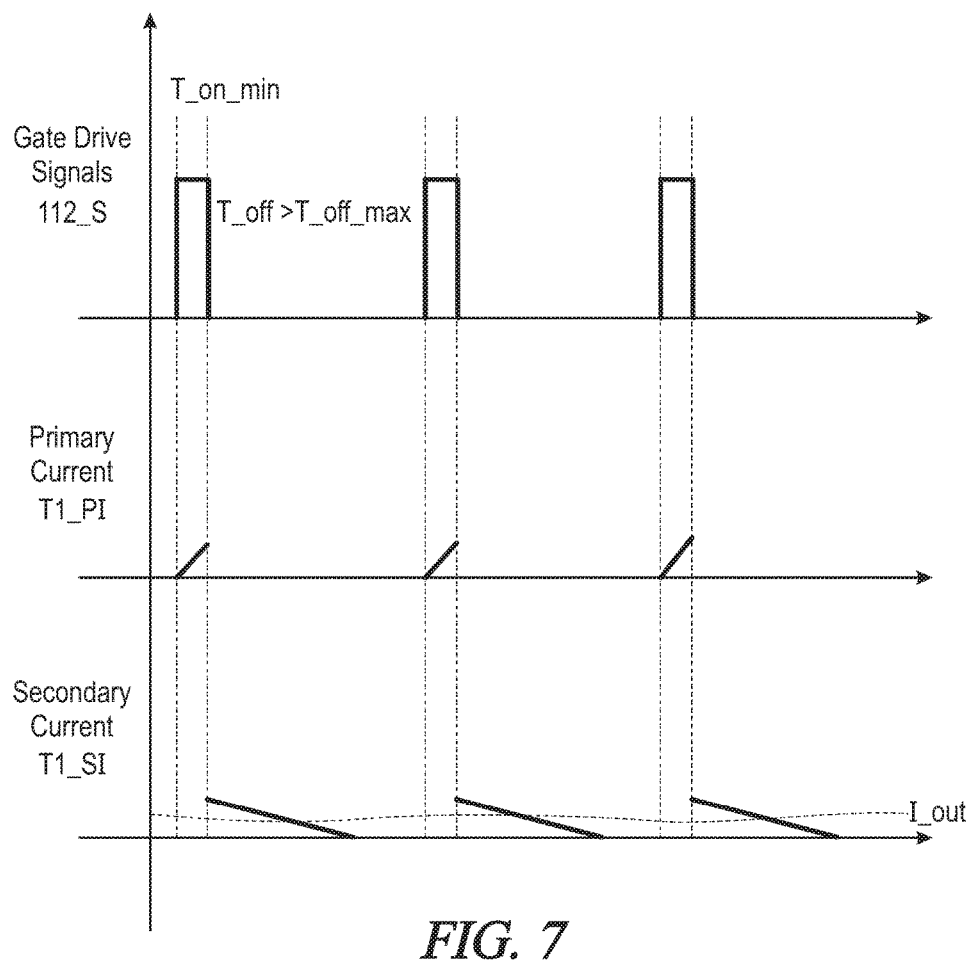
FIG. 7 is a graphical diagram representing a pattern of gate drive signals and corresponding primary and secondary currents of the circuit of FIG. 5 when the gate drive integrated circuit is operating in a second (or discontinuous) mode.

As shown in FIG. 7, a graphical diagram is depicted showing multiple duty cycles of the power converter 500 operating in the second operating mode 300, in a particular example wherein the off-time for the gate drive signals is adjusted to be greater than the predetermined maximum off-time for the gate drive signals. One key feature of the second operating mode 300 is that the secondary current T1_SI falls to zero before the next gate on-time T_on.

Figure 8:
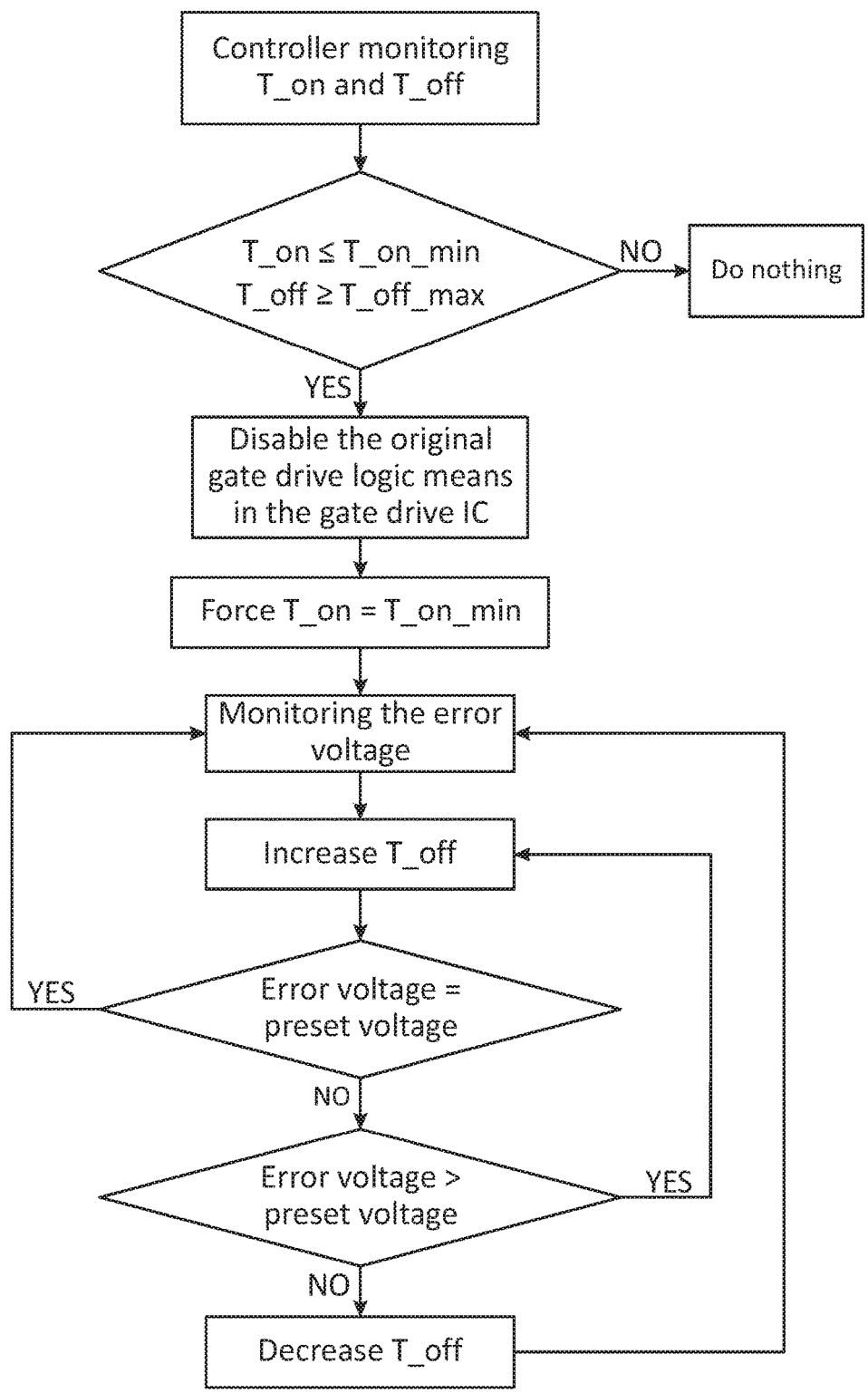
FIG. 8 is a flowchart representing an exemplary control process for the controller of the LED driver of FIG. 5.

As shown in FIG. 8, an exemplary control process for the controller 502 is provided. Initially, the controller 502 operates by monitoring and selectively enabling the on-time T_on and the off-time T_off of the gate drive signals 502_S. When the on-time T_on is greater than the minimum on-time T_on_min and the off time T_off is less than the maximum off time T_off_max (i.e., the first operating mode 200), the controller 502 will continue monitoring and selectively enabling the gate drive signals. When the on-time T_on and the off-time T_off reach their respective minimums and maximums, the controller 502 will begin operating in the second operating mode 300. The controller 502 will force or set the on-time T_on to be substantially equal to the minimum on-time T_on_min. The controller 502 then monitors the error signal 118 and adjusts the off-time T_off based on a comparison of the error signal 118 to the preset value V_set. The controller 502 increases the off-time T_off when the error signal 118 is greater than the preset value V_set. The controller 502 decreases the off-time T_off when the error signal 118 is less than the preset value V_set. The controller 502 maintains the off-time T_off and continues to monitor the error signal 118 when the error signal 118 is substantially equal to the preset value V_set.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

The term "circuit" means at least either a single component or a multiplicity of components, either active and/or passive, that are coupled together to provide a desired function.

The terms "switching element" and "switch" may be used interchangeably and may refer herein to at least: a variety of transistors as known in the art (including but not limited to FET, BJT, IGBT, IGFET, etc.), a switching diode, a silicon controlled rectifier (SCR), a diode for alternating current (DIAC), a triode for alternating current (TRIAC), a mechanical single pole/double pole switch (SPDT), or electrical, solid state or reed relays. Where either a field effect transistor (FET) or a bipolar junction transistor (BJT) may be employed as an embodiment of a transistor, the scope of the terms "gate," "drain," and "source" includes "base," "collector," and "emitter," respectively, and vice-versa.

The terms "power converter" and "converter" unless otherwise defined with respect to a particular element may be used interchangeably herein and with reference to at least DC-DC, DC-AC, AC-DC, buck, buck-boost, boost, half-bridge, full-bridge, H-bridge or various other forms of power conversion or inversion as known to one of skill in the art.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. A power converter comprising:
a power stage comprising at least one switching element and configured to provide to a load an output current corresponding to an on-time of the at least one switching element;
a controller configured to selectively enable and disable gate drive signals to the switching element to maintain a desired output current,
wherein the controller during a first operating mode is configured to generate gate drive signals in accordance with a predetermined minimum on-time and a predetermined maximum off-time,
wherein the controller is configured, upon sensing that one or more gate drive signals have reached the predetermined minimum on-time and predetermined maximum off-time during the first operating mode, during a second operating mode to fix an on-time for subsequently generated gate drive signals to be equal to the predetermined minimum on-time and to enable adjustment of an off-time for said gate drive signals to be greater than or equal to the predetermined maximum off-time.

2. The power converter of claim 1, wherein the power stage further comprises:
a transformer having a primary winding and a secondary winding, the primary winding coupled in series with and controlled by the at least one switching element, the secondary winding coupled to the load, the primary winding having primary current and the secondary winding having a secondary current; and
a feedback circuit coupled between the load and the controller, the feedback circuit configured to convert the output current of the load into a feedback error voltage by comparing the output current with a reference current, the feedback circuit further configured to transmit the feedback error voltage to the controller.

3. The power converter of claim 2, wherein during the first operating mode the primary current starts from zero and rises during an on-time for the switching element, and the secondary current falls from a first value to zero after an off-time for the switching element begins.

4. The power converter of claim 2, wherein during the second operating mode the controller is configured to reduce the secondary current to zero before a successive on-time.

5. The power converter of claim 2, wherein the off-time is continually adjusted during the second operating mode.

6. The power converter of claim 1, wherein:
the controller includes an internal comparator configured to output an internal error voltage;
the internal error voltage is continuously compared with an present voltage; and
the controller is responsive to the internal error voltage to adjust the off-time of the gate drive signals in the second operating mode.

7. The power converter of claim 6, wherein the controller increases the off-time of the gate drive signals in the second operating mode when the internal error voltage is greater than the preset voltage.

8. The power converter of claim 6, wherein the controller decreases the off-time of the gate drive signals in the second operating mode when the internal error voltage is less than the preset voltage.

9. The power converter of claim 6, wherein the controller maintains the off-time of the gate drive signals in the second operating mode when the internal error voltage is substantially equal to the preset voltage.

10. The power converter of claim 1, wherein the controller maintains the off-time and the on-time at a switching frequency greater than 120 Hz.

11. The power converter of claim 1, wherein the first operating mode is associated with a critical mode, and the second operating mode is associated with a discontinuous mode.

12. The power converter of claim 1, wherein the controller is configured to switch between the first operating mode and the second operating mode.

13. A method of controlling a power converter comprising at least one switching element driven to produce an output current, the method comprising:

in a first operating mode:
> generating gate drive signals to the at least one switching element in accordance with a predetermined minimum on-time and a predetermined maximum off-time;
> sensing that one or more of the gate drive signals has reached the predetermined minimum on-time and the predetermined maximum off-time;
> entering a second operating mode once the gate drive signals have reached the predetermined minimum on-time and the predetermined maximum off-time; and in the second operating mode:
> fixing an on-time for subsequently generating gate signals to be equal to the predetermined minimum on-time; and adjusting an off-time for said gate drive signals to be greater than or equal to the predetermined maximum off-time.

14. The method of claim 13, further comprising monitoring an error signal internal to a controller of the power converter.

15. The method of claim 14, further including comparing the error signal to a preset value and adjusting the off-time accordingly.

16. The method of claim 14, comprising:
> increasing the off-time of the gate drive signals when the error signal is greater than a preset value; and
> decreasing the off-time of the gate drive signals when the error signal is less than the preset value.

17. The method of claim 13, further including maintaining a switching frequency of the on-time and the off-time of at least 120 Hz.

18. The method of claim 13, wherein during the first operating mode the primary current starts from zero and the secondary current ends at zero.

19. The method of claim 13, wherein during the second operating mode the secondary current is reduced to zero before a successive on-time.

20. The method of claim 13, wherein the off-time is continually adjusted during the second operating mode.

* * * * *